(12) United States Patent
Wu et al.

(10) Patent No.: US 10,127,865 B2
(45) Date of Patent: Nov. 13, 2018

(54) SENSING DEVICE FOR SENSING LIGHT INTENSITY OF A PANEL MODULE AND PANEL APPARATUS THEREWITH

(71) Applicant: BENQ CORPORATION, Taipei (TW)

(72) Inventors: Ho-Shih Wu, Taipei (TW); Chih-Ren Chen, Taipei (TW)

(73) Assignee: BenQ Corporation, Taipei (TW)

( * ) Notice: Subject to any disclaimer, the term of this patent is extended or adjusted under 35 U.S.C. 154(b) by 397 days.

(21) Appl. No.: 15/000,012

(22) Filed: Jan. 18, 2016

(65) Prior Publication Data

US 2016/0216206 A1 Jul. 28, 2016

(30) Foreign Application Priority Data

Jan. 23, 2015 (TW) .............................. 104102385 A (51) Int. Cl.
*G01N 21/59* (2006.01)
*G09G 3/34* (2006.01)
*G01J 1/02* (2006.01)

(52) U.S. Cl.
CPC .............. *G09G 3/3406* (2013.01); *G01J 1/02* (2013.01)

(58) Field of Classification Search
CPC ......... G01J 1/0271; G01J 1/02; G02F 1/1309; G02F 1/133; G02F 1/13; G02F 2001/133314; G02F 1/1335; G09G 3/006; G09G 3/3406; H05K 5/0204; H05K 5/02; F16M 11/04; F16M 11/16; F16M 11/041; F16M 11/18
See application file for complete search history.

(56) References Cited

U.S. PATENT DOCUMENTS

| | | | | |
|---|---|---|---|---|
| 2007/0153548 A1* | 7/2007 | Hamada | ............... | G02B 6/0036 362/615 |
| 2009/0066631 A1* | 3/2009 | Lianza | ................. | G09G 3/3426 345/102 |
| 2011/0267381 A1* | 11/2011 | Yamazaki | ............ | G09G 3/3413 345/690 |
| 2012/0127090 A1* | 5/2012 | Lin | ....................... | G06F 3/0421 345/173 |

(Continued)

FOREIGN PATENT DOCUMENTS

| CN | 1673832 A | 9/2005 |
|---|---|---|
| CN | 101025894 A | 8/2007 |

(Continued)

*Primary Examiner* — John Lee (57) ABSTRACT

A sensing device for sensing a backlight density of a panel module is disclosed. The panel module includes a panel, a back plate and a holding frame. The back plate has an opening formed thereon and is for installing the panel onto the holding frame. The sensing device includes a sensor module and a base. The sensor module is for sensing a light projected via the opening and generated by the panel. The base is disposed between the back plate and the holding frame. The base includes a main body and a resilient structure. The main body is for containing the sensor module. The resilient structure extends from the main body and resiliently abuts against the holding frame. The resilient structure presses the main body onto the back plate when resilient abutting against the holding frame, such that the back plate and the main body cooperatively covers the sensor module.

20 Claims, 6 Drawing Sheets

(56) References Cited

U.S. PATENT DOCUMENTS

| | | | | |
|---|---|---|---|---|
| 2013/0161498 A1* | 6/2013 | Kawata | ............... | G01J 1/0425 |
| | | | | 250/227.31 |
| 2015/0070257 A1* | 3/2015 | Campbell | ............ | G09G 3/3406 |
| | | | | 345/90 |
| 2015/0362663 A1* | 12/2015 | Chiu | ................... | G02B 6/0091 |
| | | | | 349/65 |
| 2016/0216206 A1* | 7/2016 | Wu | ..................... | G09G 3/3406 |
| 2016/0365067 A1* | 12/2016 | Huang | ................ | G01B 11/272 |

FOREIGN PATENT DOCUMENTS

| | | |
|---|---|---|
| CN | 102053394 A | 5/2011 |
| CN | 102088832 A | 6/2011 |
| TW | 201122636 A1 | 7/2011 |

\* cited by examiner

SENSING DEVICE FOR SENSING LIGHT INTENSITY OF A PANEL MODULE AND PANEL APPARATUS THEREWITH

BACKGROUND OF THE INVENTION

1. Field of the Invention

The present invention refers to a sensing device and a panel apparatus therewith, and more particularly, to a sensing device for sensing light intensity of a panel module and a panel apparatus therewith.

2. Description of the Prior Art

With development of technology, a panel apparatus has been implemented into display devices of computer, such as a monitor desktop, a monitor of laptop and so on. The panel apparatus is equipped with a panel, a backlight module and a sensing device. The backlight module provides light for the panel, and the sensing device is used for detecting light intensity of the backlight module, so as to calibrate the light intensity of the backlight module and thus allow the backlight module to provide appropriate light intensity for the panel. Generally speaking, the sensing device is attached to a back plate of the backlight module. The above-mentioned attachment for the sensing device and the panel module requires additional tapes, resulting in increase of cost. Moreover, the stickiness of the tapes weakens with time and it causes detachment of the sensing device from the back plate of the backlight module after a long-term use of the backlight module.

SUMMARY OF THE INVENTION

Thus, the present invention provides a sensing device for sensing light intensity of a panel module and a panel apparatus therewith for solving above drawbacks.

According to one embodiment, the present invention provides a sensing device for sensing a backlight density of a panel module. The panel module includes a panel, a back plate and a holding frame. The back plate has an opening formed thereon and is for installing the panel onto the holding frame. The sensing device includes a sensor module and a base. The sensor module is for sensing a light projected via the opening and generated by the panel. The base is disposed between the back plate and the holding frame, and the base includes a main body and a resilient structure. A containing slot is formed on the main body, and the containing slot has an abutting opening and is for containing the sensor module. The resilient structure extends from the main body, and the resilient structure includes a resilient arm portion and an abutting wing portion. The resilient arm portion protrudes from the main body. The abutting wing portion is connected to the resilient arm portion and for abutting against the holding frame, wherein the resilient arm portion presses the main body onto the back plate when the abutting wing portion abuts against the holding frame, such that the back plate covers the abutting opening and seals the containing slot.

According to another embodiment, the present invention provides a panel apparatus including a panel module and a sensor device. The panel module includes a panel and a back plate. An opening is formed on the back plate. The back plate is for installing the panel onto the holding frame. The sensor device includes a sensor module and a base. The sensor module is for sensing a light projected via the opening and generated by the panel. The base is disposed between the back plate and the holding frame and includes a main body and a resilient structure. A containing slot is formed on the main body. The containing slot has an abutting opening and being for containing the sensor module. The resilient structure extends from the main body, and the resilient structure includes a resilient arm portion and an abutting wing portion. The resilient arm portion protrudes from the main body. The abutting wing portion is connected to the resilient arm portion and for abutting against the holding frame, wherein the resilient arm portion presses the main body onto the back plate when the abutting wing portion abuts against the holding frame, such that the back plate covers the abutting opening and seals the containing slot.

In summary, the sensing device of the present invention for sensing the light intensity of the panel is disposed between the back plate and the holding frame. When the holding frame with the sensing device is installed on the back plate, the present invention further utilizes the resilient structure of the base of the sensing device to press the main body of the base of the sensing device onto the back plate, such that the back plate covers the abutting opening and seals the containing slot. Accordingly, the sensor module of the sensing device is able to sense the light projected via the opening and generated by the panel, so as to calibrate the light intensity of the panel. As a result, the present invention does not require tapes for attaching the sensing device onto the back plate, so as to reduce manufacturing cost and prevent detachment of the sensing device from the back plate after a long-term use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
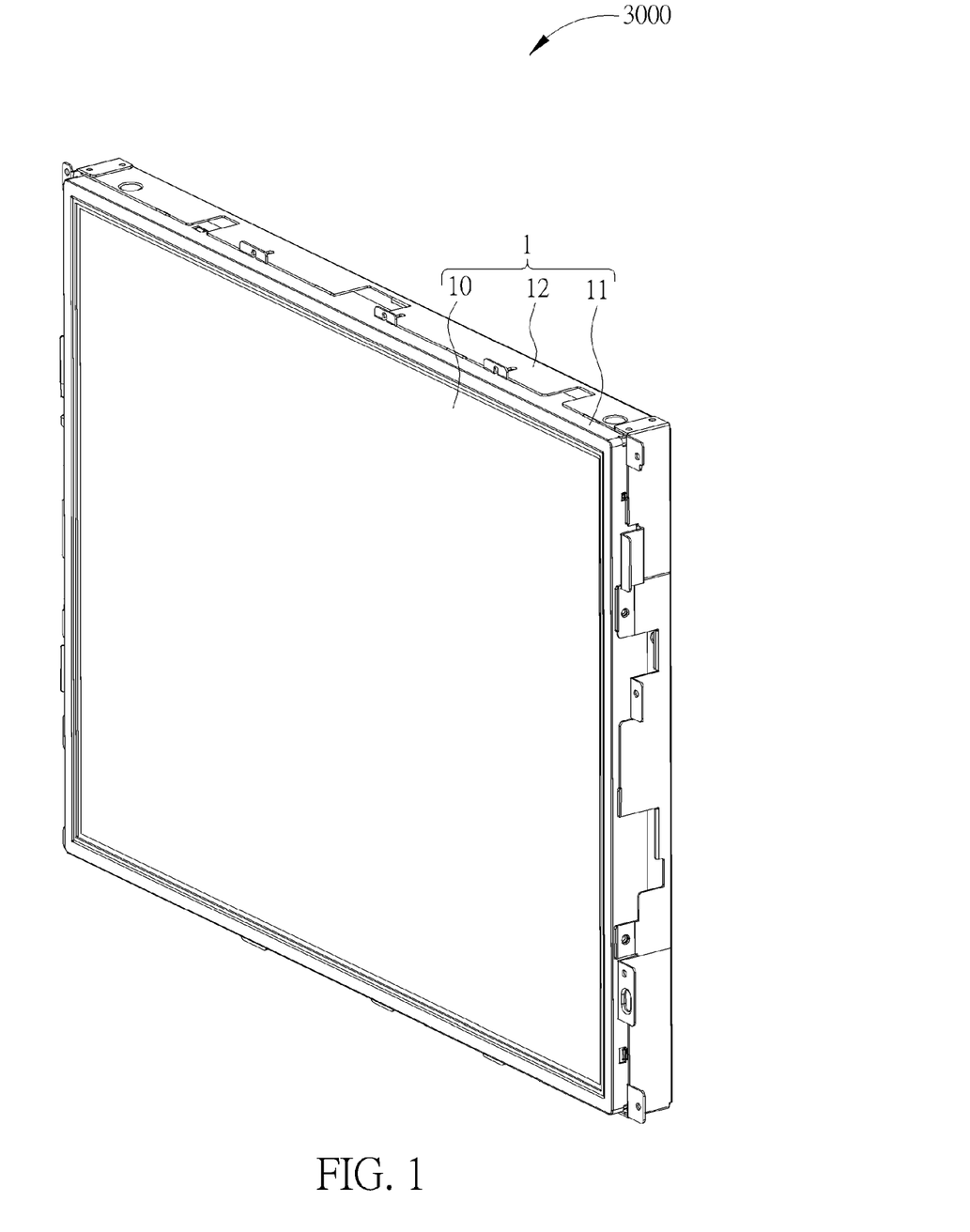
FIG. 1 is a schematic diagram of a panel apparatus according to an embodiment of the present invention.
Figure 2:
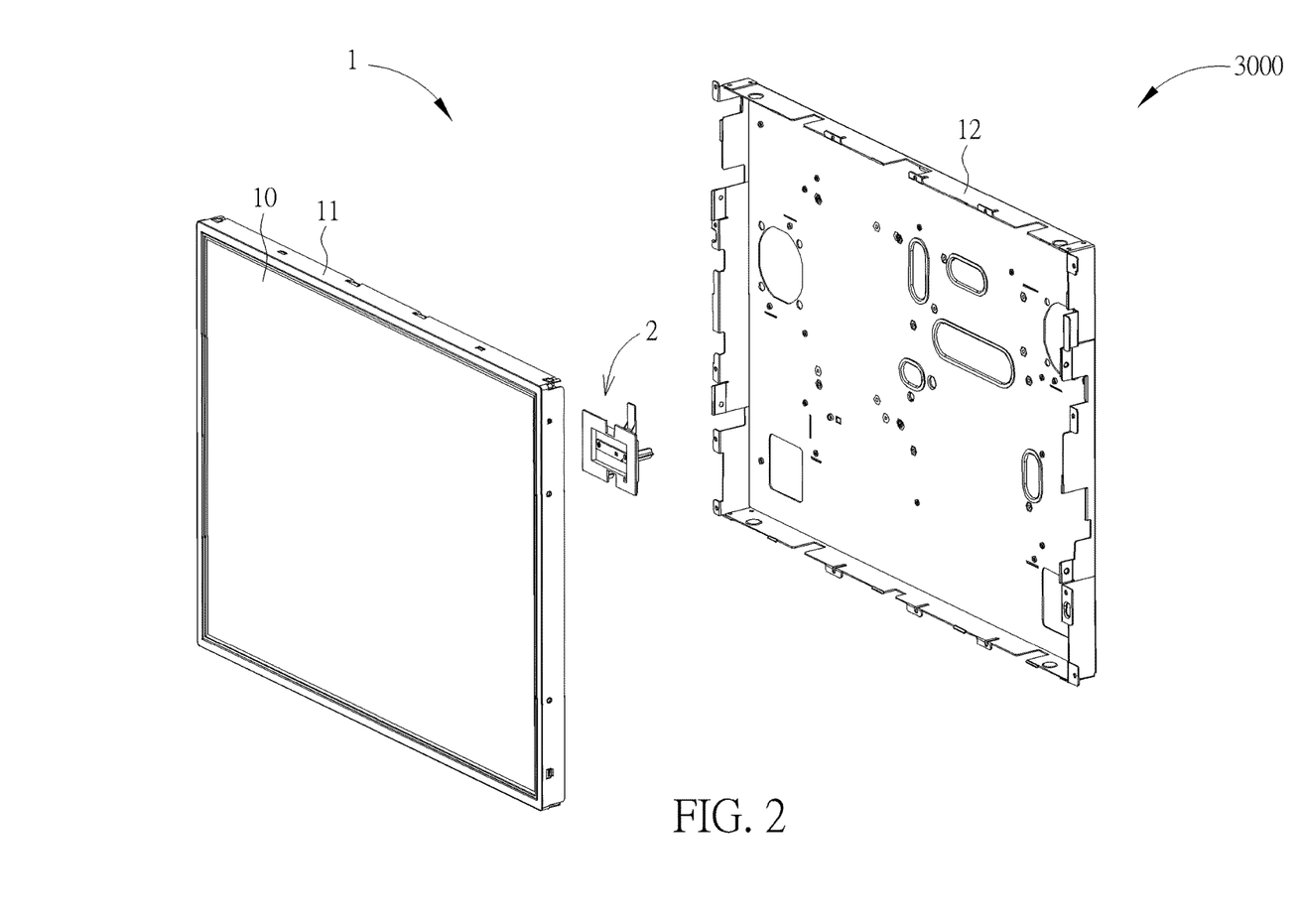
FIG. 2 is an exploded diagram of the panel apparatus according to the embodiment of the present invention.

Please refer to FIG. 1 and FIG. 2. FIG. 1 is a schematic diagram of a panel apparatus 3000 according to an embodiment of the present invention. FIG. 2 is an exploded diagram of the panel apparatus 3000 according to the embodiment of the present invention. As shown in FIG. 1 and FIG. 2, the panel apparatus 3000 includes a panel module 1, wherein the panel module 1 includes a panel 10, a back plate 11 and a holding frame 12. The panel 10 is for displaying an operating interface. The back plate 11 is for installing the panel 10 and the holding frame 12, such that the panel 10 is able to be fixed with the holding frame 12. In this embodiment, the panel apparatus 3000 is a monitor of a portable electronic device, such as a laptop computer or a monitor of a desktop electronic device, such as a desktop computer, and a user is able to operate the portable electronic device of the desktop electronic device by the operating interface displayed by the panel 10 of the panel module 1 of the panel apparatus 3000. Implementation of the panel apparatus 3000 is not limited thereto, and it depends on practical demands.

Figure 3:
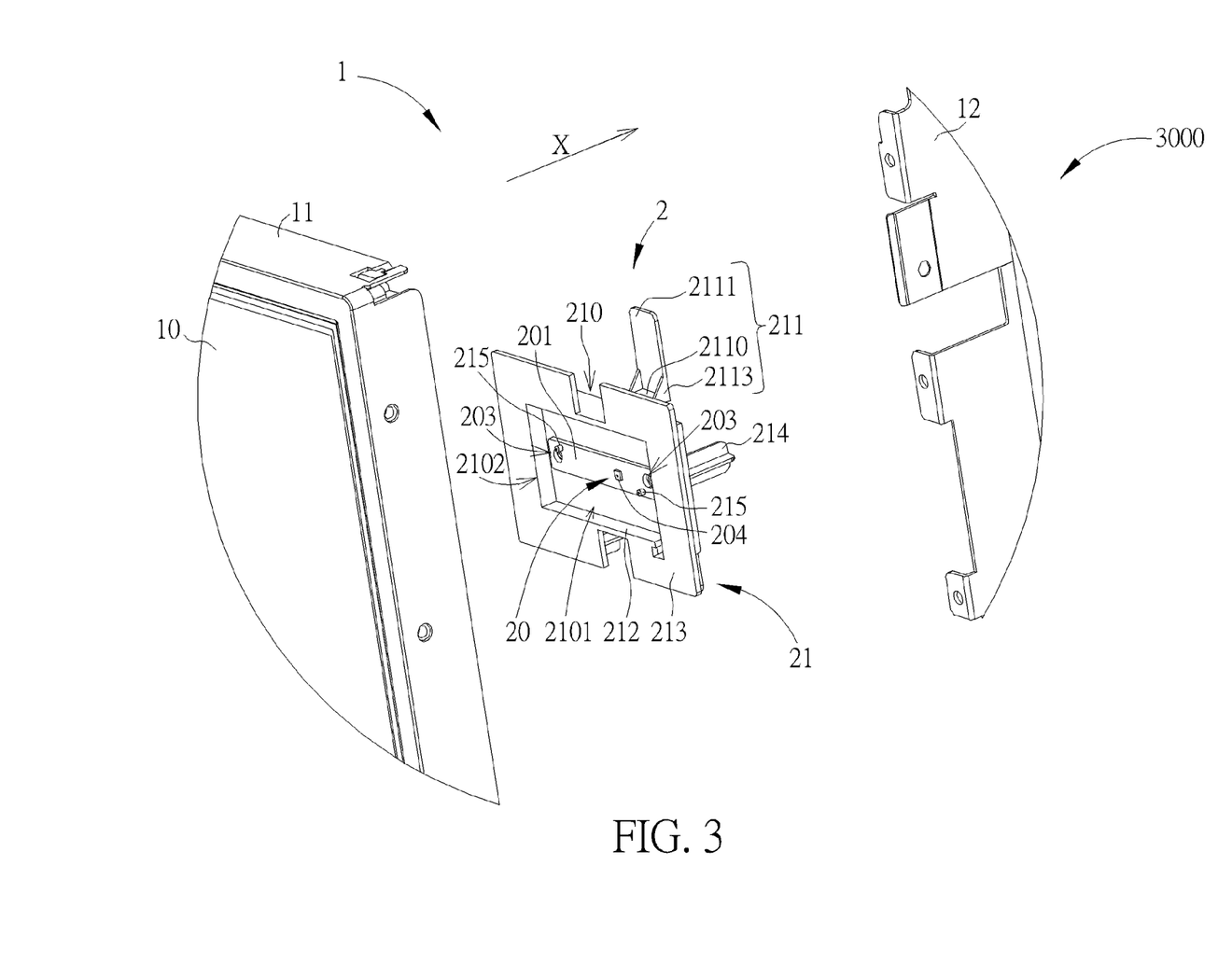
FIG. 3 is an enlarged exploded diagram of the panel apparatus according to the embodiment of the present invention.
Figure 4:
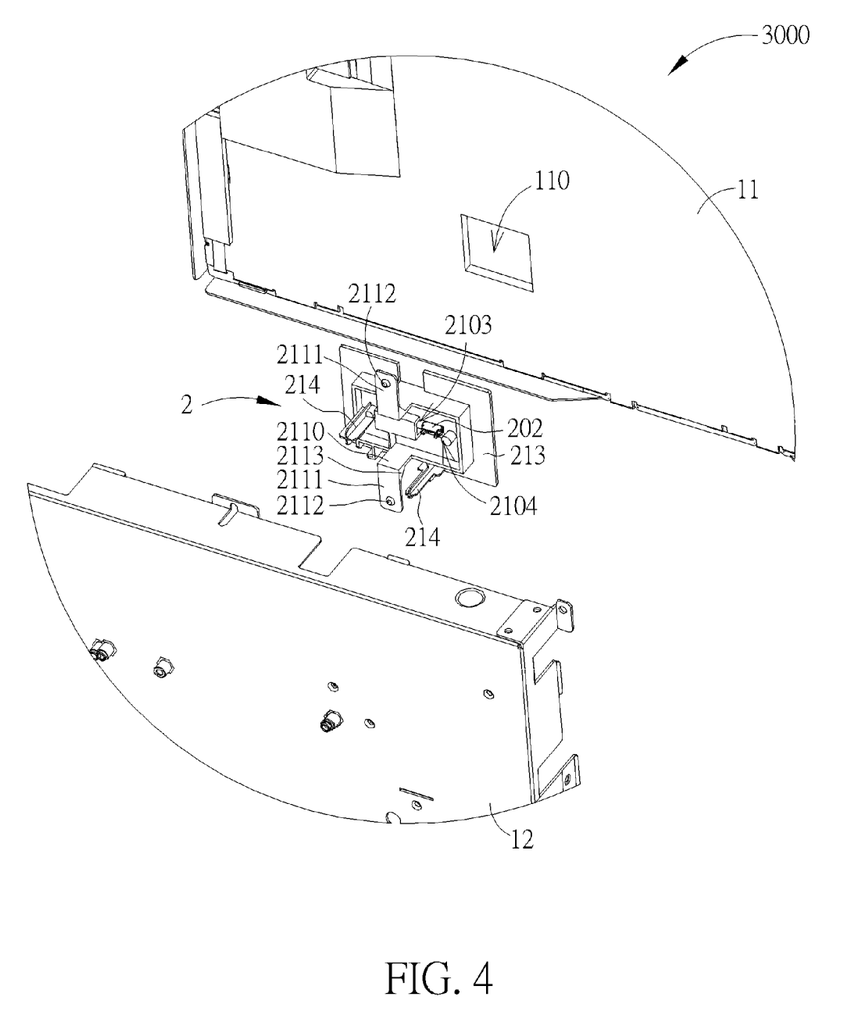
FIG. 4 is an enlarged exploded diagram of the panel apparatus in another view according to the embodiment of the present invention.

Please refer to FIG. 2 to FIG. 4. FIG. 3 is an enlarged exploded diagram of the panel apparatus 3000 according to the embodiment of the present invention. FIG. 4 is an enlarged exploded diagram of the panel apparatus 3000 in another view according to the embodiment of the present invention. As shown in FIG. 2 to FIG. 4, an opening 110 is formed on the back plate 11, and the panel apparatus 3000 further includes a sensing device 2. The sensing device 2 includes a sensor module 20 and a base 21. The sensor module 20 is used for sensing a light projected via the opening 110 and generated by the panel 10, so as to calibrate light intensity of the panel 10. Furthermore, the sensor module 20 includes a circuit board 201 and a connector 202. The connector 202 is coupled to and fixed on the circuit board 201. The base 21 is disposed between the back plate 11 and the holding frame 12 and includes a main body 210 and wall 212. A containing slot 2101 is formed on the main body 210, and the containing slot 2101 has an abutting opening 2102. The wall 212 protrudes from the main body 210 and surrounds the containing slot 2101, i.e., the wall 212 is a slot wall of the containing slot 2101, and a periphery of the wall 212 defines the abutting opening 2102 which communicates with the containing slot 2101.

As shown in FIG. 3 and FIG. 4, the base 21 further includes a first positioning structure 214 and a second positioning structure 215. The first positioning structure 214 and the second positioning structure 215 protrude from the main body 210, and the first positioning structure 214 and the second positioning structure 215 are located on two opposite sides of the main body 210. In this embodiment, the first positioning structure 214 and the second positioning structure 215 are respectively a positioning post, but the present invention is not limited thereto. An assembling slot 2103 communicating with the containing slot 2101 and an assembling opening 2104 communicating with the assembling slot 2103 are formed on the main body 210 of the base 21, wherein the assembling opening 2104 corresponds to the connector 202. In other words, openings are only located on two opposite sides of the containing slot 2101, i.e., the abutting opening 2102 and the assembling opening 2104, and areas other than the two opposite sides of the containing slot 2101 are sealed and surrounded by the wall 212.

When assembling the sensing device 2, the sensor module 20 is placed into the containing slot 2101 along an assembling direction X shown in FIG. 3 via the assembling opening 2104, such that the containing slot 2101 is able to contain the sensor module 20. During the sensor module 20 is contained into the containing slot 2101 along the assembling direction X, the second positioning structure 215 (i.e. the positioning post) is disposed through a positioning hole on the circuit board 201, such that the circuit board 201 is positioned on the main body 210 of the base 21, and the connector 202 of the sensor module 20 is disposed out of another side of the base 21 via the assembling opening 2104, such that the circuit board 201 of the sensor module 20 is successfully abut against a bottom wall of the containing slot 2101 after the second positioning structure 215 is disposed in the positioning hole.

During the aforesaid process, the assembling slot 2103 is used for providing the connector 202 with an assembling space for facilitating assembly, such that the connector 202 is successfully disposed out of the other side of the base 21 via the assembling opening 2104, so as to prevent the connector 202 from interfering with the bottom wall of the containing slot 2101 during the above-mentioned process. Accordingly, the connector 202 is able to successfully dispose out of the other side of the base 21 via the assembling opening 2104 during the above-mentioned process and it allows the circuit board 201 to abut against the bottom wall of the containing slot 2101 successfully. When the circuit board 201 successfully abuts against the bottom wall of the containing slot 2101, the circuit board 201 covers not only where the containing slot 2101 communicates with the assembling slot 2103 but also where the containing slot 2101 communicates with the assembling opening 2104, so as to seal the side of the containing slot 2101 which has the assembling slot 2103 and the assembling opening 2104.

When the above-mentioned assembly is completed, the sensor module 20 is able to be screwed onto the base 21. For example, in this embodiment, the circuit board 201 of the sensor module 20 has two screw holes 203, as shown in FIG. 3. When the circuit board 201 abuts against the bottom wall of the containing slot 2101, a screw component (not shown in figures) is utilized for screwing the circuit board 201 onto the bottom wall of the containing slot 2101 via the screw holes 203, so as to fix the sensor module 20 on the base 21. Ways to fix the sensor module 20 with the base 21 is not limited to those illustrated in figures in this embodiment. For example, the sensor module 20 can be hooked or latched onto the base 21 as well. As for which one of the above-mentioned designs is adopted, it depends on practical demands.

Figure 5:
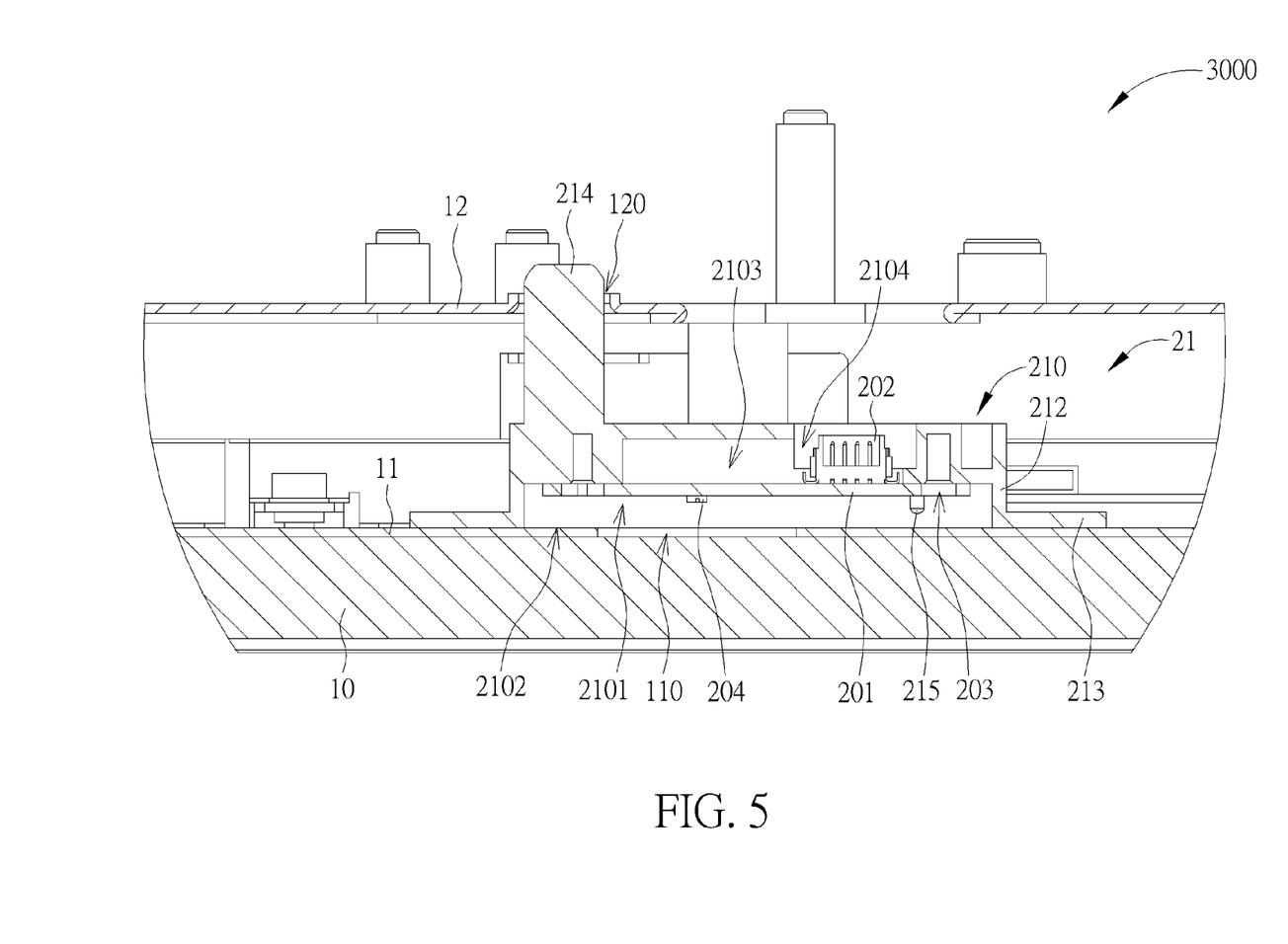
FIG. 5 is a partly sectional diagram of the panel apparatus according to the embodiment of the present invention.
Figure 6:
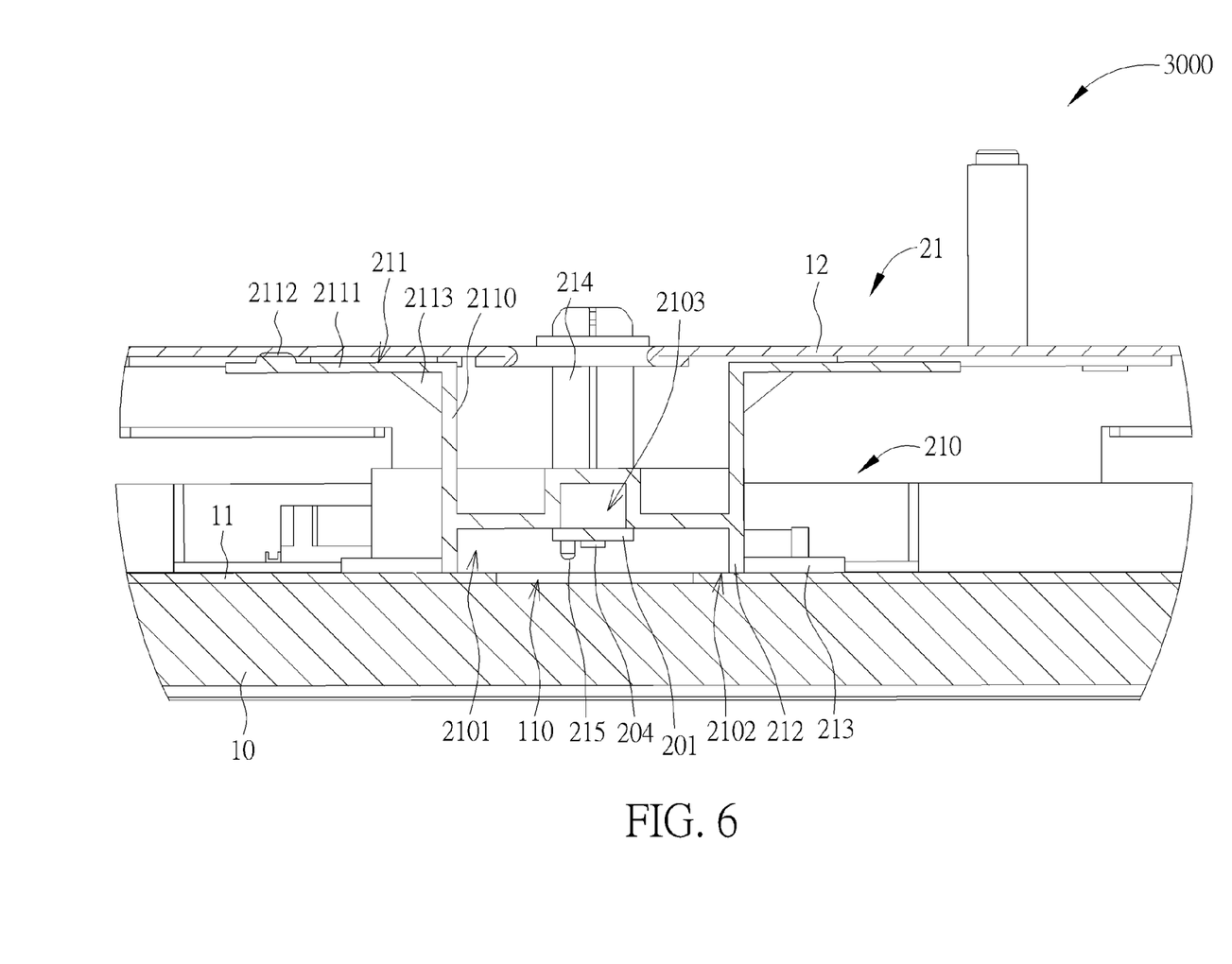
FIG. 6 is a partly sectional diagram of the panel apparatus in another view according to the embodiment of the present invention.

Please refer to FIG. 3 to FIG. 6. FIG. 5 is a partly sectional diagram of the panel apparatus 3000 according to the embodiment of the present invention. FIG. 6 is a partly sectional diagram of the panel apparatus 3000 in another view according to the embodiment of the present invention. As shown in FIG. 3 to FIG. 6, the base 21 of the sensing device 2 further includes a resilient structure 211 protruding from the main body 210. The resilient structure 211 includes a resilient arm portion 2110 and an abutting wing portion 2111. The resilient arm portion 2110 protrudes from the main body 210, and the abutting wing portion 2111 is connected to the resilient arm portion 2110. In this embodiment, the abutting wing portion 2111 of the resilient structure 211 is perpendicular to the bottom wall of the containing slot 2101 on the main body 210, and the abutting wing portion 2111 is perpendicular to the resilient arm portion 2110, i.e., the abutting wing portion 2111 is substantially parallel to the bottom wall of the containing slot 2101. In other words, the resilient structure 211 is a substantially L-shaped structure, but structures of the resilient structure 211 of the present invention are not limited to those illustrated in figures in this embodiment.

As mentioned above, after the sensor module 20 is fixed onto the base 21, the first positioning structure 214 (i.e. the positioning post) of the base 21 is disposed through a positioning hole 120 on the holding frame 12, as shown in FIG. 5, so as to position the sensing device 2 on the holding frame 12. Afterwards, the holding frame 12 with the sensing device 2 is installed onto the back plate 11. Due to abutting of the abutting wing portion 2111 against the holding frame 12, the holding frame 12 provides the abutting wing portion 2111 with a pressing force when the holding frame 12 with the sensing device 2 is installed onto the back plate 11, so as to deform the resilient arm portion 2110 of the resilient structure 211. Accordingly, the resilient arm portion 2110 of the resilient structure 211 is able to press the main body 210 onto the back plate 11. In such a manner, the back plate 11 is able to cover the abutting opening 2102 on the main body 210 and seals the containing slot 2101.

In other words, the circuit board 201 of the sensor module 20 covers the assembling slot 2103 and the assembling opening 2104 on one side of the containing slot 2101 when the sensor module 20 is installed inside the containing slot 2101, so as to prevent ambient light from projecting into the containing slot 2101 via the assembling slot 2103 and the assembling opening 2104. The back plate 11 covers the abutting opening 2102 located on the other side of the containing slot 2101 when the holding frame 12 with the sensing device 2 is installed on the back plate 11, so as to prevent the ambient light from projecting into the containing slot 2101 via the abutting opening 2102. Accordingly, an optical sensor 204 (as shown in FIG. 5) on the circuit board 201 of the sensor module 20 is able to senses the light projected via the opening 110 and projected by the panel 10 without being affected by the ambient light, so as to calibrate the light intensity of the panel 10.

As shown in FIG. 3 and FIG. 4, the resilient structure 211 can further include a connecting rib 2113 connecting the resilient arm portion 2110 and the abutting wing portion 2111. The connecting rib 2113 is for strengthening structural stiffness for the resilient arm portion 2110 and the abutting wing portion 2111. Furthermore, it strengthens the resilient recovery force of the resilient structure 211, so as to ensure that the back plate 11 covers the abutting opening 2102 on the main body 210 and seals the containing slot 2101. It should be noticed that the base 21 can further include a flange 213 extending from the wall 212. The flange 213 and the resilient structure 211 are located on two opposite sides of the main body 210. When the resilient structure 211 presses the main body 210 onto the back plate 11, the flange 213 overlaps on periphery of the opening 110 on the back plate 11, so as to further prevent the ambient light from projecting into the containing slot 2101 via the abutting opening 2102, i.e., the flange 213 is used for sealing the opening 110 and the sensor module 20 inside the containing slot 2101.

As shown in FIG. 3 to FIG. 6, the abutting wing portion 2111 of the resilient structure 211 can has an abutting protrusion 2112. The abutting protrusion 2112 is for abutting against the holding frame 12. When the holding frame 12 with the sensing device 2 is installed on the back plate 11, the abutting protrusion 2112 is able to enhance movement which the holding frame 12 does to the abutting wing portion 2111, so as to ensure deformation of the resilient arm portion 2110 that enable the main body 210 to be pressed onto the back plate 11.

Compared to the prior art, the sensing device of the present invention for sensing the light intensity of the panel is disposed between the back plate and the holding frame. When the holding frame with the sensing device is installed on the back plate, the present invention further utilizes the resilient structure of the base of the sensing device to press the main body of the base of the sensing device onto the back plate, such that the back plate covers the abutting opening and seals the containing slot. Accordingly, the sensor module of the sensing device is able to sense the light projected via the opening and generated by the panel, so as to calibrate the light intensity of the panel. As a result, the present invention does not require tapes for attaching the sensing device onto the back plate, so as to reduce manufacturing cost and prevent detachment of the sensing device from the back plate after a long-term use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensing device for sensing a backlight density of a panel module, the panel module comprising a panel, a back plate and a holding frame, the back plate having an opening formed thereon and being for installing the panel onto the holding frame, the sensing device comprising:
    a sensor module for sensing a light projected via the opening and generated by the panel; and
    a base disposed between the back plate and the holding frame, the base comprising:
        a main body whereon a containing slot is formed, the containing slot having an abutting opening and being for containing the sensor module; and
        a resilient structure extending from the main body, the resilient structure comprising:
            a resilient arm portion protruding from the main body; and
            an abutting wing portion connected to the resilient arm portion and for abutting against the holding frame, wherein the resilient arm portion presses the main body onto the back plate when the abutting wing portion abuts against the holding frame, such that the back plate covers the abutting opening and seals the containing slot.

2. The sensing device of claim 1, wherein the base further comprises:
    a wall protruding from the main body and surrounding the containing slot, a periphery of the wall defining the abutting opening.

3. The sensing device of claim 2, wherein the base further comprises:
    a flange extending from the wall and for sealing the opening and the sensor module inside the containing slot.

4. The sensing device of claim 1, wherein the sensor module comprises a circuit board and a connector, the connector is coupled to the circuit board, an assembling slot is further formed on the main body, the assembling slot communicates with the containing slot and is for installing the connector, and the circuit board covers where the containing slot communicates with the assembling slot.

5. The sensing device of claim 4, wherein an assembling opening is further formed on the main body, and the assembling opening communicates with the assembling slot and corresponds to the connector.

6. The sensing device of claim 1, wherein the abutting wing portion has an abutting protrusion, and the abutting wing portion abuts against the holding frame.

7. The sensing device of claim 1, wherein the base further comprises:
   a first positioning structure protruding from the main body and for positioning the main body on the holding frame.

8. The sensing device of claim 7, wherein the sensor module comprises a circuit board, and the base further comprises:
   a second positioning structure protruding from the main body and for positioning the circuit board on the main body.

9. The sensing device of claim 1, wherein the resilient structure is a substantially L-shaped structure, and the resilient arm portion is substantially perpendicular to the abutting wing portion.

10. The sensing device of claim 1, wherein the resilient structure further comprises a connecting rib connecting the resilient arm portion and the abutting wing portion.

11. A panel apparatus, comprising:
    a panel module, comprising:
       a panel; and
       a back plate whereon an opening is formed, the back plate being for installing the panel onto the holding frame; and
    a sensor device, comprising:
       a sensor module for sensing a light projected via the opening and generated by the panel; and
       a base disposed between the back plate and the holding frame, the base comprising:
          a main body whereon a containing slot is formed, the containing slot having an abutting opening and being for containing the sensor module; and
          a resilient structure extending from the main body, the resilient structure comprising:
             a resilient arm portion protruding from the main body; and
             an abutting wing portion connected to the resilient arm portion and for abutting against the holding frame, wherein the resilient arm portion presses the main body onto the back plate when the abutting wing portion abuts against the holding frame, such that the back plate covers the abutting opening and seals the containing slot.

12. The panel apparatus of claim 11, wherein the base further comprises:
    a wall protruding from the main body and surrounding the containing slot, a periphery of the wall defining the abutting opening.

13. The panel apparatus of claim 12, wherein the base further comprises:
    a flange extending from the wall and for sealing the opening and the sensor module inside the containing slot.

14. The panel apparatus of claim 11, wherein the sensor module comprises a circuit board and a connector, the connector is coupled to the circuit board, an assembling slot is further formed on the main body, the assembling slot communicates with the containing slot and is for installing the connector, and the circuit board covers where the containing slot communicates with the assembling slot.

15. The panel apparatus of claim 14, wherein an assembling opening is further formed on the main body, and the assembling opening communicates with the assembling slot and corresponds to the connector.

16. The panel apparatus of claim 11, wherein the abutting wing portion has an abutting protrusion, and the abutting wing portion abuts against the holding frame.

17. The panel apparatus of claim 11, wherein the base further comprises:
    a first positioning structure protruding from the main body and for positioning the main body on the holding frame.

18. The panel apparatus of claim 17, wherein the sensor module comprises a circuit board, and the base further comprises:
    a second positioning structure protruding from the main body and for positioning the circuit board on the main body.

19. The panel apparatus of claim 11, wherein the resilient structure is a substantially L-shaped structure, and the resilient arm portion is substantially perpendicular to the abutting wing portion.

20. The panel apparatus of claim 11, wherein the resilient structure further comprises a connecting rib connecting the resilient arm portion and the abutting wing portion.

* * * * *